Sept. 3, 1935.  E. C. READ  2,013,478
LUBRICATING SYSTEM
Filed Jan. 25, 1933  2 Sheets-Sheet 1
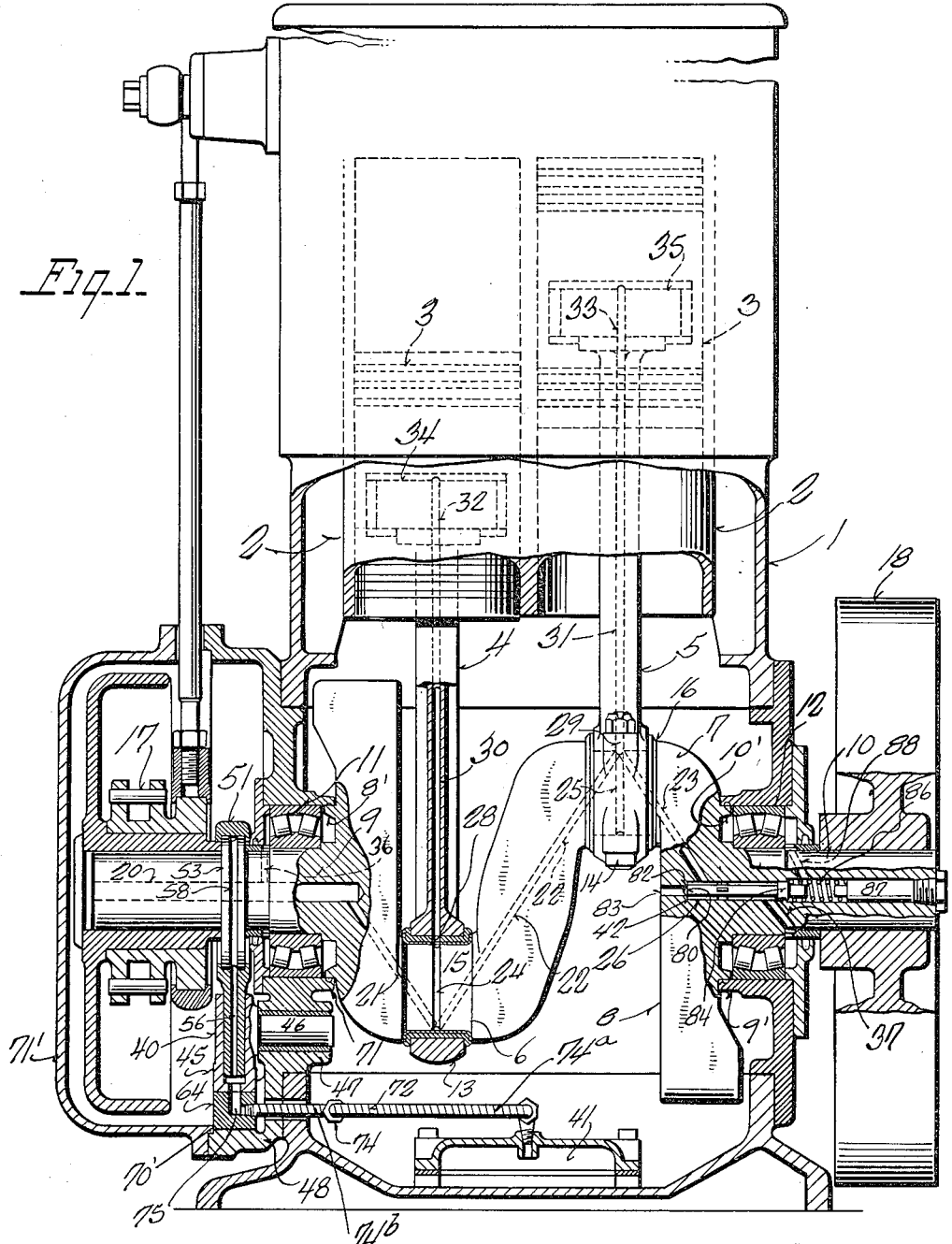
INVENTOR.
Everett C. Read,
BY
ATTORNEYS Sept. 3, 1935.   E. C. READ   2,013,478
LUBRICATING SYSTEM
Filed Jan. 25, 1933   2 Sheets-Sheet 2
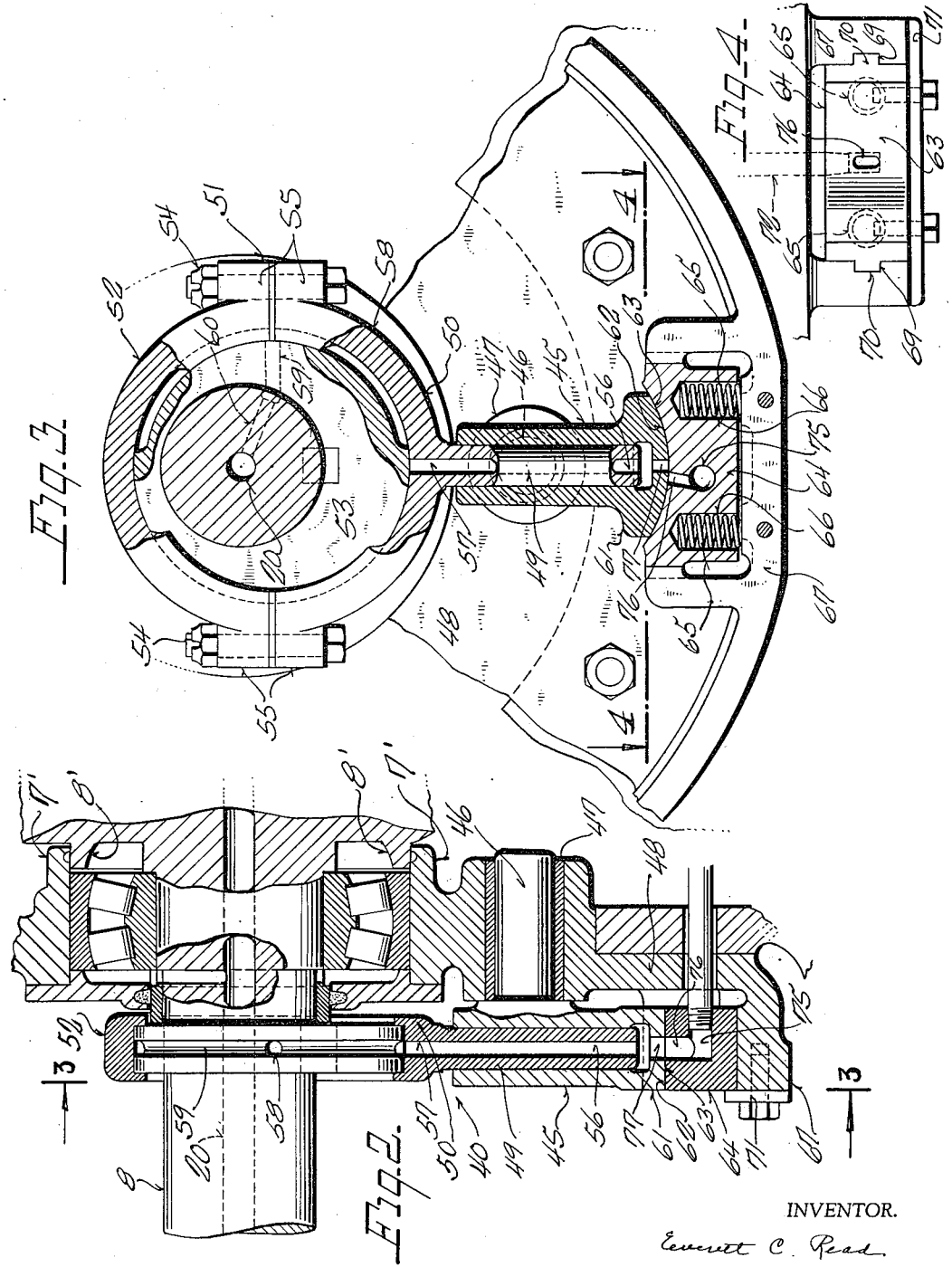
INVENTOR.
Everett C. Read
BY
ATTORNEYS Patented Sept. 3, 1935

2,013,478

UNITED STATES PATENT OFFICE 2,013,478

LUBRICATING SYSTEM

Everett C. Read, Milwaukee, Wis., assignor to The Filer & Stowell Co., Milwaukee, Wis., a corporation of Wisconsin Application January 25, 1933, Serial No. 653,382

8 Claims. (Cl. 184—32)

This invention relates to an improvement in lubricating systems, especially designed for use in connection with the main or crank shaft bearings, connecting rod bearings and wrist pin bearings of an engine such as a steam engine, internal combustion engine, or the like, although also capable of advantageous use with other types of machines and bearings.

One of the objects of the invention is to provide a lubricating system of this character wherein the lubricant throughout the system is maintained under a predetermined pressure and yet provision is made for circulation of the lubricant and this in such manner that it not only effectively lubricates but to some extent also exerts a cooling action on the parts.

Another object of the invention is to provide a lubricating system of this character which eliminates pipes or threaded parts except on the suction side of the oil pump embodied in the system, the distributing system for the lubricant on the pressure side being made up of drilled passages or machined grooves.

Another object of the invention is to provide a novel form of oil pump which is simple and durable in construction, reliable and efficient in operation and easy and comparatively inexpensive to manufacture and install, and yet is capable of delivering the required amount of oil and of maintaining the desired pressure in the system. The pump eliminates valves and yet has a nice control over the distribution of the oil and an efficient pumping action.

In carrying out the invention, the crank shaft has lubricant distributing passages drilled therethrough and communicating at appropriate points with the main bearings and with distributing grooves in lubricating relation to the connecting rod bearings and with passages leading through the connecting rods to similar grooves in the wrist pin bearings. The oil pump draws the lubricant from an oil sump provided in a crank case and delivers the lubricant to the passages at one end of the crank shaft. The lubricant so delivered flows through the oil passages and grooves to the various points to be lubricated. At the end of the crank shaft opposite the pump a spring loaded relief valve is provided, the valve being held against its seat by a properly adjusted spring and having a pressure responsive surface exposed to the oil pressure in the lubricating system so that when this pressure exceeds a predetermined value the action of the spring will be overcome, the relief valve will be opened, and the oil will be discharged from the system back into the crank case. This organization insures the maintenance of proper pressure in the system at all times but as the relief valve is either open or continually opening and closing effective circulation of the oil is had and a desirable cooling effect obtained. In the absence of extremely abnormal conditions oil cannot escape from the system without first flowing through the crank shaft and over all bearings throughout the length of the crank shaft.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in front elevation and partly in central vertical longitudinal section showing a steam engine equipped with a lubricating system and oil pump embodying the present invention;

Figure 2 is a fragmentary view partly in front elevation and partly in central vertical longitudinal section further illustrating the oil pump proposed by the present invention;

Figure 3 is a view in transverse vertical section taken on line 3—3 of Figure 2; and Figure 4 is a detail view in top plan showing the oil supply head with the barrel of the pump removed, the oil supply head being viewed from the plane of line 4—4 of Figure 3 and looking in the direction of the arrows.

Referring to the drawings, and more particularly to Figure 1, the numeral 1 designates generally an engine, shown for the sake of example as being a steam engine having cylinders 2 in which pistons 3 reciprocate. Connecting rods 4 and 5 are provided between the pistons and the cranks 6 and 7 of a crank shaft designated generally at 8. The crank shaft 8 has journals 9 and 10 supported for rotation in main bearings or crank shaft bearings 11 and 12. The lower ends of the connecting rods are provided with connecting rod bearings 13 and 14, in which the journal portions 15 and 16 of the crank shaft are received. The extreme left hand end of the crank shaft as viewed in Figure 1 is provided with the operating means 17 for the valves (not shown). As this valve operating means forms no part of the present invention it is not described in detail. The extreme opposite end of the crank shaft may be provided with a flywheel 18.

In the crank shaft 8 lubricant distributing passages designated at 20, 21, 22, and 23 are formed, the passage 20 extending axially through one end of the crank shaft and the passages 21, 22 and 23 extending at an angle through the cranks 6 and 7, as shown in Figure 1. The outer end of the passage 20 is appropriately plugged. The passage 21 communicates at one end with the passage 20 and at its other end communicates with an annular oil groove 24 provided in the crank pin 15 or its bearing shell. One end of the passage 22 also communicates with this annular oil groove and at its opposite end communicates with a similar oil groove 25 provided in the crank pin 16 or its bearing shell. The passage 23 communicates at one end with the annular oil groove 25 and at its other end with an axial opening 26 provided in one end of the crank shaft and containing a spring loaded relief valve designated generally at 27 and which will be hereinafter more fully described. The connecting rod bearings 13 and 14 are provided with oil holes 28 and 29 affording communication between the annular oil grooves 24 and 25 and oil passages 30 and 31 which extend up through the connecting rods 4 and 5 to annular oil grooves 32 and 33 provided in the wrist bearings designated generally at 34 and 35.

A transverse passage 36 is drilled in the crank shaft and leads from the passage 20 to the main bearing 11. A similar passage 37 leads from the axial opening 26 of the crank shaft to the main bearing 12.

The present invention proposes a pump designated generally at 40 for drawing oil from a sump 41 provided in the crank case and forcing the oil so drawn into the passage 20 from whence the oil flows through the passage 36 to main bearing 11 and through to the annular oil groove 24 and also through the passage 22 to the annular oil groove 25, thence to the passage 23 from whence oil flows to the opening 26 and through passage 37 to the main bearing 12. Under the action of the pump 40, oil is also forced through the oil holes 28 and 29, up through the passages 30 and 31 and into the oil grooves 32 and 33 of the wrist pin bearings.

It will thus be understood that the oil under pressure is delivered by the pump to the oil passage 20 at one end of the crank shaft and thereafter cannot escape from the lubricating system without first flowing through the crank shaft and over the various bearings, some of the oil flowing back into the sump after seeping from the bearings at the various points to be lubricated and the remainder flowing back to the sump through the relief valve 26 at the remote end of the crank shaft.

The flow of the oil through the main bearings 11 and 12 is from points adjacent the outside of the casing inwardly toward the interior of the crank case that as the oil is admitted to the outside of the races of such bearings and passes through them in one direction whereby to prevent dirt from entering such bearings and to wash out any dirt that may be present. The passages leading to the main bearings, which are either of the ball or roller type, are sufficiently small or restricted to insure the proper amount only of lubricant being supplied thereto. The escape of oil or lubricant from the main bearing is restricted by the rotatably interfitting annular flange 7' and 8' adjacent the bearing 11 and similar flanges 9' and 10' adjacent the bearing 12. Sufficient oil does escape, however, through the annular spaces between the flanges to insure the proper lubricating action. As will be understood from Figures 1 and 2, the flanges 8' and 10' are formed on cheek plates of the crank shaft 8 and rotate therewith while the flanges 7' and 9' are formed on stationary sections of the engine casing.

The oil pump 40 is shown to advantage in Figures 2, 3, and 4, and, as illustrated, comprises a pump barrel 45 which, intermediate its ends, has a trunnion 46 integral therewith or otherwise appropriately connected thereto. The trunnion 46 is rockably fitted in a bushed bearing 47 provided therefor on a stationary part 48 of the engine structure. In this way the pump barrel 45 is supported for oscillatory movement. A pump plunger 49 is fitted in the barrel for reciprocatory movement. The outer end of the plunger is integral with or suitably connected to the lower section 50 of an eccentric strap designated generally at 51 and made up of the section 50 and a cooperating section 52, these sections 51 and 52 being of channel form in cross section as shown in Figure 2 and being held encircling an eccentric 53 by means of bolts and nuts 54 coacting with confronting apertured ears 55 provided on the sections of the eccentric strap. The plunger 49 is hollow, that is, it has an axial or longitudinal opening 56 extending entirely therethrough. The opening 56 extends down through the lower end of the plunger and also communicates at its upper end with a similar opening 57 formed in the eccentric strap section 50 as a continuation of the opening 56. The openings 56 and 57 periodically communicate with a peripheral groove 58 formed in the eccentric 53 and extending for approximately one half of the circumferential extent of the eccentric. The groove coacts with the channel-shaped sections of the eccentric strap to provide a closed passage which, at times, communicates with the opening 57 and consequently also with the opening 56 and which is in constant communication with a transverse passage 59 drilled through the eccentric and in turn communicating at all times at its inner end with a transverse passage 60 drilled in the crank shaft 8 and opening into the axial passage 20 thereof.

The lower end of the pump barrel is enlarged as at 61 and has the general form of a segment, this enlarged end having an arcuate face 62 accurately machined or finished and formed on an arc struck from the axis of the trunnion 46 as a center. Cooperable with this curved convex face 62 of the barrel is a correspondingly curved concave face 63 of a valve supply head 64. The valve supply head 64 is in the form of a block and preferably is urged into engagement with the pump barrel by means of springs 65 accommodated in recesses 66 formed in the block and bearing at their upper ends against the inner ends of the recesses and at their lower ends against a mounting bracket 67 provided for the pump supply head. This mounting bracket 67 may be formed integral with a part of the casing structure of the engine. Vertical grooves 69 may be provided in the side members of the mounting bracket and receive guide ribs 70 integrally formed with the oil supply head 64 (see Figure 4). A removable plate 71 may be provided to lap the slight space between the lower end of the oil distributing head and the bottom portion of the mounting bracket, as shown in Figures 2 and 4 or in lieu of such a plate the space may be lapped by a portion 70' of a casing section 71' (see Figure 1). Obviously, this oil supply head may be fixed in position but a floating mounting together with the use of the springs to force it against the pump barrel with the proper pressure is advantageous in that it provides an automatic take-up for wear and provides an excess pressure relief means.

By selecting springs 65 of proper strength excess pressure may be relieved at the pump, the springs yielding under the influence of such excess pressure and allowing oil to flow out between the contacting faces 62 and 63. In this way breakage or rupture of the parts which might follow blocking of the passages of the system is avoided.

An oil supply line 72 is provided between the sump 41 and the oil supply head 64. Preferably this oil supply line is made up of flexible seamless tubing 74a with a union connection at one end to the sump and with a union connection at its other end to seamless flexible tubing 74b, the other end of which is threaded in the oil supply head 64 and communicates with an oil passage 75 therein. This oil passage 75 in turn communicates with an oil supply port 76 which extends out through the concave faces 63 of the oil supply head. The pump barrel 45 has an oil inlet port 77 extending from the working chamber of the barrel out through the concave face 62 at the lower end thereof. The ports 76 and 77 are so related that on the suction stroke of the plunger these ports are registered for the interval required for the pump plunger to draw a charge of oil into the barrel, whereas on the working or discharge stroke of the plunger the ports 76 and 77 are out of registry. This action of the ports 76 and 77 results from the oscillating movement of the pump barrel which, in turn, is effected from the eccentric through the plunger and by virtue of the trunnion mounting of the pump barrel. When the plunger is descending or making a working stroke the ports 76 and 77 are, as stated, out of registry, but at this time the groove 58 in the eccentric is in communication with the opening 57 so that the oil is forced out of the barrel up through the openings 56 and 57 into the groove 58 and thence through the passages 59 and 60 into the oil passage 20 and consequently through the oil distributing system. On the suction stroke of the pump the ungrooved or solid part of the eccentric overlaps the openings 57 and there is no communication between this opening 57 and the annular oil groove 58. As a consequence when the port 77 comes into registry with the port 76 the upward movement of the plunger in the barrel will fill the pump barrel full of oil.

The spring loaded relief valve 27 has a beveled end 89 normally engaged with a correspondingly formed seat 82 formed at the inner end of a discharge opening 83 leading into the opening 26. This valve 80 is smaller than the opening 26 in which it works and projects from one end of a piston 84 which is a snug working fit in this opening 26. The piston 84 is backed up by a compression coil spring 86 which is compressed to the desired extent by means of an adjustable abutment 87 threaded into the outer end of the opening 26 and also serving as a plug for the same. The oil entering the chamber 26 exerts its pressure against the portion of the piston exposed to the chamber and thus tends to open the valve against the action of the spring 86. However, the pressure must rise to a value that will be effective to overcome the spring 86 before the relief valve will open and this valve is determined by the adjustment of the abutment 87. Whenever the relief valve opens, oil discharges from the system through the opening 83 thus promoting circulation of the oil and reducing the pressure to the desired value as well as producing a cooling effect. As soon as the pressure drops to the desired value the spring 86 again seats the valve. Such oil as may work past the piston 84 escapes out through a relief passage 88 leading to the main bearing 12 and supplementing the action of the passage 37 in supplying oil to this bearing.

The present invention thus provides a forced feed of lubrication throughout and accomplishes this desirable action without the use of pipes or threaded parts except on the suction side of the pump. The advantage of maintaining a predetermined pressure throughout the lubricating system is had and this is accomplished in such a way as to insure circulation of the oil. The oil is supplied by the pump to one end of the crank shaft and must flow through the various bearings to be lubricated until it reaches the relief valve at the remote end of the crank shaft. Finally, the system is simple and durable in its structure, reliable and effective in operation, requires practically no maintenance and may be conveniently applied to the engine.

The invention is not restricted to any particular type of bearing but may be advantageously used with sleeve or babbitted bearings as well as anti-friction ball or roller bearings, and also for lubricating parts which slide or reciprocate relative to each other.

While I have shown and described one construction as illustrating how the invention may be embodied, it is to be understood that the construction shown has been selected merely for the purposes of illustration and that various changes may be made in the size, shape and arrangement of the parts without departing from the spirit of the invention or the scope of the subjoined claims.

The invention claimed is:

1. An oil pump comprising a barrel supported for rocking movement, a plunger fitted in said barrel for reciprocatory movement, means for reciprocating said plunger in such manner as to cause said barrel to oscillate, and an oil supply block cooperable with said barrel, said barrel and said block each being individually supported and having cooperable ports registering on the suction stroke of the plunger and out of registry on the working stroke thereof, all under the influence of the oscillatory movement of the barrel.

2. An oil pump comprising a barrel supported for oscillatory movement, and having one end open and provided at its opposite end with a segmental head formed with an inlet port, an oil supply block having a concave face engaged with said head and provided with an oil supply port cooperable with said inlet port to provide the valve action required for the suction and discharge strokes of said pump, a plunger reciprocable in said barrel and having a longitudinal opening therethrough, an eccentric strap connected to said plunger and having an opening formed as a permanent continuation of the plunger opening, an eccentric having a peripheral groove periodically communicating with said opening and a shaft connected to said eccentric for rotating the same, and said shaft having an oil delivery passage and said eccentric having a transverse passage providing constant communication between said peripheral groove and said oil delivery passage.

3. An oil pump comprising a barrel supported for working movement, a hollow plunger reciprocable in said barrel, a rotatable eccentric having an eccentric strap connected to said plunger, an oil supply head cooperable with said barrel, said eccentric having a groove extending part way therearound and periodically communicating with the hollow plunger for establishing communication between said groove and said barrel during the working stroke and shutting off such communication during the suction stroke, said groove communicating with an outlet, and means controlled by the rocking of the barrel for establishing communication between the barrel and said supply head on the suction stroke and shutting off such communication on the working stroke.

4. An oil pump comprising a barrel supported for rocking movement, a hollow plunger reciprocable in said barrel, a rotatable eccentric having an eccentric strap connected to said plunger, an oil supply head cooperable with said barrel, said eccentric having a groove extending part way therearound and periodically communicating with the hollow plunger for establishing communication between said groove and said barrel during the working stroke and shutting off such communication during the suction stroke, said groove communicating with an outlet, said barrel and said supply head having cooperable ports registering during the suction stroke and being out of registry during the working stroke whereby oil may be drawn into the barrel during the suction stroke and expelled through the outlet during the working stroke.

5. An oil pump comprising a barrel supported for rocking movement, a plunger fitted in said barrel for reciprocatory movement, means for reciprocating said plunger in such manner as to cause said barrel to oscillate, an oil supply block cooperable with said barrel, said barrel and said block having cooperable ports registering on the suction stroke of the plunger and out of registry on the working stroke thereof, all under the influence of the oscillatory movement of the barrel, and spring means for urging said block into engagement with said barrel.

6. An oil pump comprising a barrel having a trunnion intermediate its ends, said barrel being supported for rocking movement by said trunnion, a plunger fitted in said barrel for reciprocatory movement, means for reciprocating said plunger in such manner as to cause said barrel to oscillate, an oil supply head, said barrel and said head having engaging convex and concave surfaces and being provided with cooperable ports extending through said surfaces and adapted to be brought into and out of registry as the convex surface of the barrel sweeps back and forth across the concave surface of the head whereby the plunger may draw oil from the head into the barrel on the suction stroke and flow of oil from the barrel back to the head on the working stroke is prevented.

7. An oil pump comprising a barrel supported for rocking movement, a plunger fitted in said barrel for reciprocatory movement, means for reciprocating said plunger in such manner as to cause said barrel to oscillate, an oil supply block cooperable with said barrel, said barrel and said block having cooperable ports registering on the suction stroke of the plunger and out of registry on the working stroke thereof, all under the influence of the oscillatory movement of the barrel, and yieldable means for urging said block into engagement with said barrel, said yieldable means permitting movement of said block away from said barrel to permit of escape of oil in the event that the pressure exceeds the predetermined value.

8. An oil pump comprising an oil supply head having an oil supply port, a pump barrel having an oscillatory support intermediate its ends and having an oil inlet port, a plunger fitted in said barrel for reciprocatory movement, said plunger having means forming an oil outlet, there being means providing a cut-off for said outlet, said barrel and said supply head being so related that said ports alternately register and non-register upon oscillation of said barrel, and means imparting reciprocatory movement to said plunger in such a manner as to cause said barrel to oscillate, said oscillatory support absorbing thrust forces placed upon said barrel.

EVERETT C. READ.